(No Model.)

W. WELCH.
CENTER BOARD FOR VESSELS.

No. 336,365. Patented Feb. 16, 1886.

WITNESSES
F. L. Durand
Edward Stanton

INVENTOR
William Welch
By Louis Bagger & Co.
Attorneys.

N. PETERS, Photo-Lithographer, Washington, D. C.

UNITED STATES PATENT OFFICE.

WILLIAM WELCH, OF MOSS POINT, MISSISSIPPI.

CENTER-BOARD FOR VESSELS.

SPECIFICATION forming part of Letters Patent No. 336,365, dated February 16, 1886.

Application filed December 12, 1885. Serial No. 185,472. (No model.)

*To all whom it may concern:*

Be it known that I, WILLIAM WELCH, a citizen of the United States, and a resident of Moss Point, in the county of Jackson and State of Mississippi, have invented certain new and useful Improvements in Center-Boards for Vessels; and I do hereby declare that the following is a full, clear, and exact description of the invention, which will enable others skilled in the art to which it appertains to make and use the same, reference being had to the accompanying drawings, which form a part of this specification, and in which—

Figure 1:
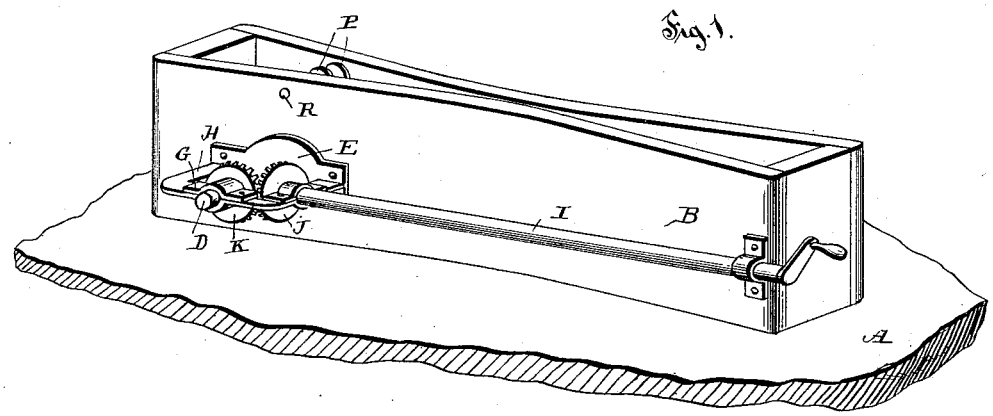
Figure 2:
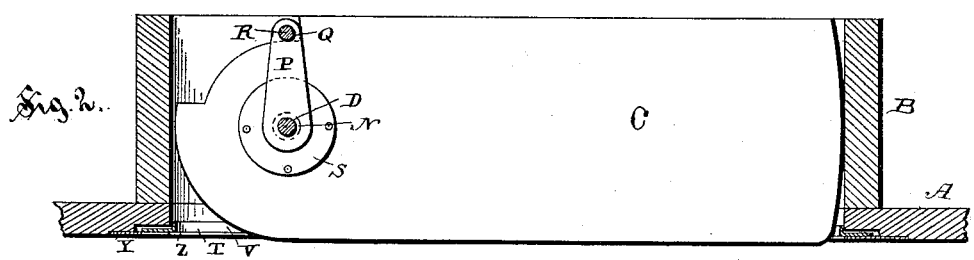
Figure 3:
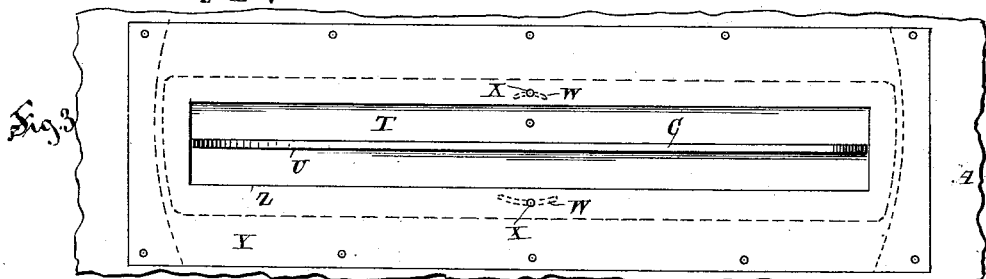
Figure 4:
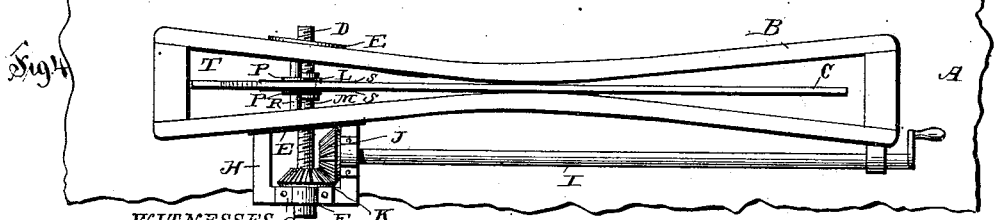

Figure 1 is a perspective view of as much of the hull of a vessel as will be sufficient to illustrate the position of my improved center-board, portions of the hull being broken away. Fig. 2 is a longitudinal vertical sectional view of the same. Fig. 3 is a bottom view, and Fig. 4 is a top view.

Similar letters of reference indicate corresponding parts in all the figures.

My invention has relation to center-boards for sailing-vessels; and it consists in the improved construction and combination of parts of a center-board having an adjustment relative to the keel of the vessel, which will enable the vessel to sail closer to windward than a vessel having its center-board without the adjustment, as hereinafter more fully described and claimed.

In the accompanying drawings, the letter A indicates a portion of the hull, and B indicates the well or casing for the center-board C, the said well or casing having its ends gradually widening, the casing being contracted at the middle to just accommodate the board, and widening toward the ends, so as to allow the board to have its ends moved laterally with the sides of the contracted middle as a fulcrum. A screw, D, is journaled with its smooth ends in tight bearings E E in the sides of the casing at its forward end, and one or both of the ends of the screw are formed with annular reduced portions F F, which revolve in bearings G, formed in brackets H, upon the sides of the casing, so as to prevent any lateral displacement of the screw, and one end of the screw is provided with a bevel-wheel, which meshes with another bevel-wheel upon a shaft, I, which is provided with suitable means for revolving it, so that by revolving the said drive-shaft the two bevel-wheels or gears J and K may cause the screw to be revolved. A nut, L, turns upon the threaded portion M of the screw, and has a reduced smooth portion, N, at its middle, upon which smooth portion the perforation O in the forward end of the center-board fits and turns, and this nut is formed at its ends with two upwardly-projecting arms, P P, having perforations Q at their upper ends, with which perforations they slide upon a smooth bolt, R, secured at the upper edge, s, of the sides of the casing. Washers S S are interposed between the center-board and the arms of the nut, bearing tightly against the sides of the board at its perforation, preventing the water from having too much effect upon the wood surrounding the perforation. It will be seen that by turning the screw the nut will travel to one side or the other upon the screw, being prevented from turning with the revolving screw by the perforated arms sliding upon the guide-bolt, the board being rocked to stand at an angle to the keel of the vessel by the said screw, rocking with its middle bearing against the contracted portions at the middles of the sides of the casing. The board may be provided with any suitable means for dropping its rear end and for supporting the same. A plate, T, having a longitudinal slot, U, with upwardly-turned flanges V at its edges bearing against the sides of the board, is secured to the bottom of the hull, covering the opening of the casing or well, and this plate is formed with two segmental slots, W W, at the middle of the plate and at each side of the slot, with which slots it rocks upon two bolts, X X, projecting from the bottom of the hull at points registering with the middles of the sides of the casing, so that the slotted plate may rock with the center-board and prevent too much water from entering up into the casing, and thus retard the speed of the vessel. A plate, Y, having a rectangular slot or aperture, Z, is secured to the bottom of the vessel, covering parts of the slotted plate, which slides between it and the hull of the vessel, and the aperture in this covering-plate is of a sufficient size to allow the center-board and the slotted plate to rock freely to their utmost limit. It will now be seen that when the vessel is on the port-tack and the forward end of the center-board is set toward the starboard side by means of the screw, the pressure upon the board, which is let down into the water, will have a tendency to force the vessel to windward, thus preventing the vessel from making too much leeway, and at the same time forcing the vessel by the power of the water bearing against the center-board, as the vessel moves forward, to windward. The angle at which the board will accomplish the best results without retarding the vessel may be ascertained by experiment, and the center-board may be set at any desired angle by means of the screw and the nut upon the same clamping the forward end of the board.

The means for revolving the screw or for moving the forward end of the center-board may be simplified, as the device is intended for smaller vessels, while the power required to move the forward end of the board in a larger vessel will necessarily be greater, for which reason the means for moving it must consequently be increased in power, and several modifications of the means for moving the forward end of the board may be made without departing from the spirit of my invention. By having the casing for the center-board contracted at its middle the board will have a fulcrum in the same, rocking upon the middles of the contracted sides, and this construction will strengthen the board, which will bear with its forward end against one of the sides of the casing as it is tilted to one side or the other.

Having thus described my invention, I claim and desire to secure by Letters Patent of the United States—

1. In a sailing-vessel, the combination of a casing opening through the bottom of the vessel and having the middles of its sides contracted and the ends diverging, a longitudinally-slotted plate sliding over the bottom aperture of the casing, a center-board fitting in the casing and passing through the slot in the sliding plate, and means for setting the center-board at different angles to the center line of the vessel, as and for the purpose shown and set forth.

2. In a sailing-vessel, the combination of a casing or well opening through the bottom of the vessel and having the middles of its sides contracted and the ends diverging, a center-board fitting in the casing and having means for placing it at different angles to the center line of the vessel within the casing, a longitudinally-slotted plate sliding over the open lower end of the casing and having flanges at the edges of the slot bearing against the sides of the board, and a covering-plate confining the sliding plate and having an aperture or slot, allowing free movement for the center-board, as and for the purpose shown and set forth.

3. In a sailing-vessel, the combination of a center-board having means for setting it at different angles to the center line of the vessel, and a longitudinally-slotted plate having the board projecting through its slot, and having segmental slots at its middle at both sides of the slot sliding with the slots upon bolts in the bottom of the vessel, as and for the purpose shown and set forth.

4. In a sailing-vessel, the combination of a casing opening through the bottom of the vessel and having its sides contracted at their middles and diverging at their ends, a center-board fitting in the casing and having means for setting it at different angles to the center line of the vessel, a longitudinally-slotted plate having the edges of the slot bent upward, bearing against the sides of the board, and having segmental slots at its middle at both sides of the slot, sliding upon bolts in the bottom of the vessel, and a covering-plate confining the sliding plate between it and the bottom of the vessel, and having an aperture allowing free play for the board, as and for the purpose shown and set forth.

5. In a sailing-vessel, the combination of a casing having the middles of its sides contracted and the ends diverging and opening through the bottom of the vessel, a screw journaled at its ends in the sides of one end of the casing and having suitable means for revolving it, a nut fitting upon the screw and having two upwardly-projecting perforated arms at its ends, a center-board pivoted at its forward end upon the nut between the arms, and a guide-bolt at the upper edges of the casing for the perforated ends of the arms, as and for the purpose shown and set forth.

6. In a sailing-vessel, the combination of a casing having its sides contracted at the middles and diverging at the ends and opening through the bottom of the vessel, a screw journaled in the sides of the casing at their forward ends and having reduced or shouldered portions at its ends journaled in brackets upon the sides of the casing, a nut fitting upon the screw and having upwardly-projecting arms at its ends, perforated at the upper ends, a center-board having its forward end pivoted with a perforation upon the nut, washers interposed between the board and the arms of the nut, a guide-bolt at the upper edges of the casing for the perforated ends of the arms, and means for revolving the screw, as and for the purpose shown and set forth.

In testimony that I claim the foregoing as my own I have hereunto affixed my signature in presence of two witnesses.

WILLIAM WELCH.

Witnesses:
WM. WATKINS,
P. H. FREELAND.